Nov. 6, 1951 E. E. KLEINSCHMIDT 2,573,718

TELEGRAPH SYSTEM

Filed Aug. 28, 1943 4 Sheets-Sheet 1

Inventor

Edward E. Kleinschmidt,

By Strauch & Hoffman

Attorneys

Inventor
Edward E. Kleinschmidt,
By Strauch & Hoffman
Attorneys

Inventor
Edward E. Kleinschmidt,
By Strauch & Hoffman
Attorneys

Nov. 6, 1951 | E. E. KLEINSCHMIDT | 2,573,718

TELEGRAPH SYSTEM

Filed Aug. 28, 1943 | 4 Sheets-Sheet 4

Inventor

Edward E. Kleinschmidt,

By Strauch & Hoffman

Attorneys

Patented Nov. 6, 1951

2,573,718

UNITED STATES PATENT OFFICE 2,573,718

TELEGRAPH SYSTEM

Edward E. Kleinschmidt, Highland Park, Ill.

Application August 28, 1943, Serial No. 500,414

17 Claims. (Cl. 178—69)

My present invention relates to telegraph systems and apparatus, and more particularly to systems and apparatus for detecting faults in the transmission of telegraph messages.

More particularly, my invention relates to the detection of faults in telegraph message transmission utilizing automatic and manual switching equipment for the reception of messages at repeating stations in perforated tape or other suitable recording media which can be used in suitable apparatus to automatically re-transmit the messages. A fully automatic switching and re-transmitting system of this type is shown in my Patent No. 2,193,967, in which every message when received by the addressee controls answer back apparatus which automatically sends a confirmation message to the sender to indicate that his message has been properly received. Some systems in use at the present time use in part automatic and in part manual switching and check transmission over trunk line circuits by automatically adding successive count numbers to messages as they are transmitted so that lost or mutilated messages may be traced. An attendant at the receiving station checks these numbers for consecutiveness as well as for the correct reception of the message. Means have also been devised to indicate the improper operation of trunk circuits such as may be caused by a grounded or an open line.

Since the blank or non-perforating combination is used in standard circuits to feed out tape between messages when the perforator does not keep up with transmission as well as during idle time, there are at times quite a number of such combinations present in the tape which in automatic systems become cumulative and therefore take up considerable line time in their transmission.

All of such prior methods for safeguarding the correct transmission of telegraph messages are, however, inefficient and complicated, and are wasteful of line time. Furthermore, they all require a great deal of manual supervision to detect and correct any faults that may occur, thus interposing undesirable delays in transmission.

In my invention, a checking or test signal is automatically transmitted and received on test instruments which are switched into the circuits between messages, without, however, being recorded in the received message record. If the signal checks, the succeeding messages are transmitted and, so long as the received checking signals correspond with the setting of the test instrument at the receiving position, message transmission continues. If, however, a received checking signal does not check with the setting of the receiving test instrument, or if any fault occurs in the receiving apparatus to prevent the reception of the test or checking signal, or if a blank combination appears in the body of a message, or if the line is opened or grounded, thus preventing the reception of the test or checking signal, the receiving apparatus is automatically stopped and an alarm signal is given to the station attendant who thereupon communicates with the sending station to correct the fault and to re-transmit messages that were transmitted during the fault interval.

Messages in accordance with my invention are preferably transmitted by positive and negative or marking and spacing impulses in signal combinations of the Baudot five unit permutation code.

I preferably use the blank or non-marking or non-perforating combination for a message end signal followed by single marking impulses for the test signal combinations with novel test or checking instruments that repeat these signal combination settings consecutively. However, as will be apparent to those skilled in the art, some of the features of my invention may be used in other systems. For example, the arrangement of circuits hereinafter disclosed can be adapted to a six unit code by adding the sixth contact or magnet wherever necessary, and the checking signals may remain leaving the counting devices unaltered.

I also provide means to prevent the recording and re-transmission of more than one such blank or message end signal, such as now occurs with considerable waste of line time. To this end in the preferred embodiment of my invention I utilize the first blank signal to signify the end of a message and to switch circuits to the test instruments at both ends of the line. A test impulse is then automatically sent and received immediately thereafter. Further blank signals at the sending station are transmitted but not recorded, thus preventing accumulation and re-transmission of blank perforations or signals in automatic message switching systems.

Accordingly, a primary object of the present invention is to provide simple and efficient means to check telegraph messages sent over trunk circuits, either multiplex or simplex, to the extent that the line circuit and apparaus is in operating condition, and to the end that no message or part of a message shall be lost.

Another object is to provide improved and efficient methods and apparatus to detect incorrect operation of telegraph transmitting and receiving apparatus.

Still another object is to prevent recording in the medium used for re-transmission at the receiving station of blank selecting or check signal combinations other than those contained in the message end signal.

A further object of my invention is to automatically transmit a checking or test signal from the sending station to the receiving station at periodic intervals between messages.

Still further objects of my invention are to associate in improved manner a counter with each checking transmitter and each checking receiver to register the successive counts; to provide novel means for stopping reception of messages and to operate an alarm signal, if the count numbers at the receiving and sending stations do not check, or if a fault occurs in the circuits or apparatus; and to imprint corresponding numbers on the record medium used for transmission at the sending station and on the received record medium at the receiving station for each message or group of messages in consecutive order.

Further objects will become apparent from the following description and claims.

Referring now to the drawings.

*Test apparatus*

Figure 1:
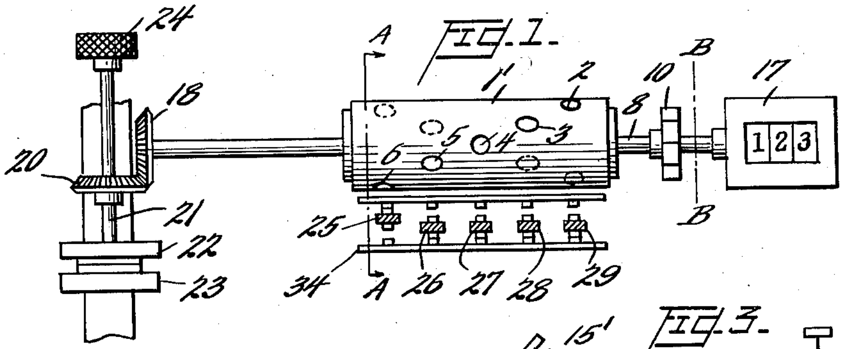
Figure 1 is a schematic view illustrating a preferred embodiment of test instrument, counting apparatus and numbering stamp.
Figures 2, 3:
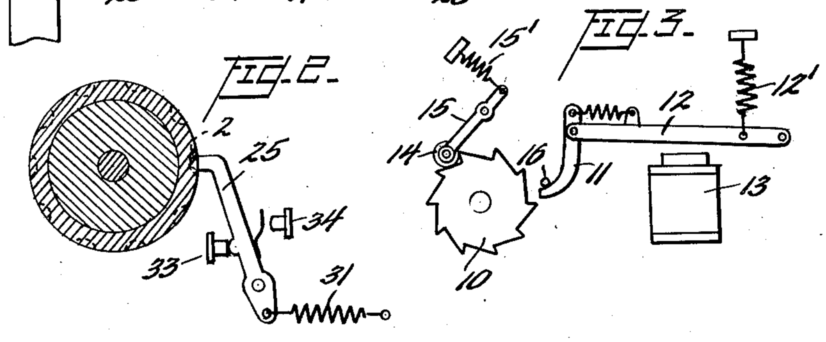
Figure 2 is a sectional view along line A—A of Figure 1.
Figure 3 is a sectional view along line B—B of Figure 1.

Referring to Figures 1, 2 and 3, in my preferred embodiment of test instrument, I employ cylinder 1 having two rows of five indentations, each numbered 2 to 6 and each arranged in a spiral over its cylindrical surface. Cylinder 1 is fixed to a shaft 8 mounted in suitable bearings not shown. A 10-toothed ratchet wheel 10 is fixed to shaft 8. Feed pawl 11 pivoted on armature lever 12 of magnet 13 engages ratchet 10 upon energization of magnet 13 to turn shaft 8 and parts connected thereto step by step. Armature lever 12 is held normally retracted by a suitable spring 12′. A detent lever 15 carrying a detent roller 14 is pressed against ratchet 10 by spring 15′ to hold ratchet 10 in the set position. Feed pawl 11 when retracted engages pin 16 and is withdrawn from contact with ratchet wheel 10 under influence of spring 12′. A counter 17 is operated by shaft 8 to count the operations of magnet 13.

Shaft 8 drives a bevel gear 18 which meshes with a bevel gear 20 attached to a shaft 21 which advances the printing wheels 22 and 23 of a numbering stamp one digit for each operation of magnet 13. Shaft 21 extends to a suitable knob 24 which the operator may turn to set and reset the numbering assembly as may be necessary.

Five contact fingers numbered 25, 26, 27, 28, and 29 are pressed against the cylinder 1 by individual springs 31. These contact fingers drop into the indentations 2 to 6 of cylinder 1 in succession as the cylinder is turned by the operation of magnet 13, lever 12 and pawl 11 on ratchet 10. In Figure 2, contact finger 25 is shown moved into indentation 2 and is in contact with the contact bar 33 common to all of the fingers 25 to 29. Contact fingers 26, 27, 28 and 29 (not shown in Figure 2 but shown in Figure 1) are, in this position of cylinder 1, riding on the cylinder face and are in contact with bar 34.

Figure 4:
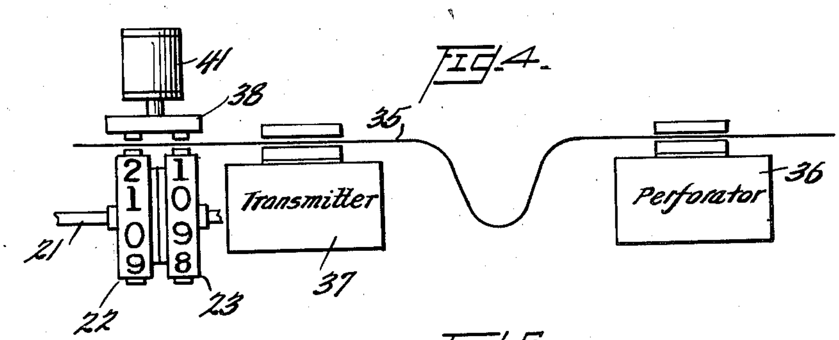
Figure 4 is a schematic view of the sending tape perforator, transmitter, and numbering stamp at a sending station in the preferred embodiment of my invention.
Figure 5:
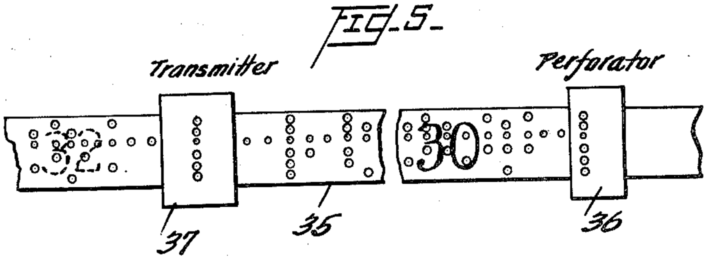
Figure 5 shows how the count number is imprinted on the tape over the perforations at the sending station.

In the transmitting position shown in Figures 4 and 5, tape 35 has been perforated with code perforations comprising a telegraph message by the perforator 36 which may be of any well known construction. Tape 35 passes from the perforator to a transmitter 37 which may also be of any well known construction. Tape 35 then passes through the numbering stamp between numbering wheels 22 and 23 and a print hammer 38 operated by a comparatively slow acting solenoid magnet 41 which, when energized, prints the message number on the underside of the tape.

Figure 6:
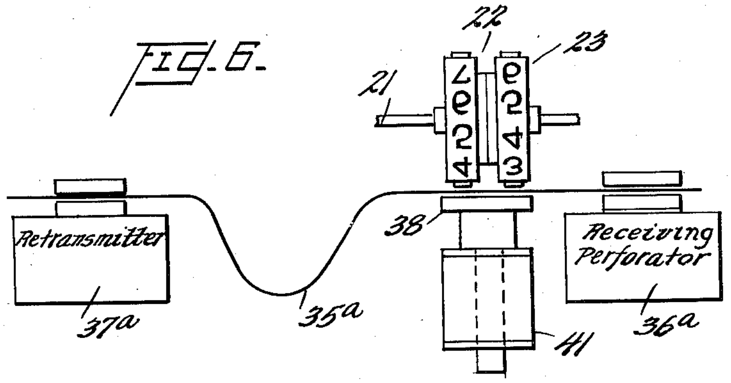
Figure 6 illustrates the receiving tape passing through the receiving perforator, numbering stamp and re-transmitter at the receiving and repeating station.

At the receiving and repeating station of Figure 6, the numbering is the same as Figures 4 and 5 except that the numbering stamp is located in advance of the receiving perforator 36*a* and prints the number on the upper side of the tape 35*a* to distinguish the number of a transmitted message from the number of a received message. However, different print colors or other means of distinctively recording the numbers may be used to distinguish between transmitted and received messages. Tape 35*a* then passes through re-transmitter 37*a* to repeat the messages in well known manner.

*Circuit connections*

Figure 7:
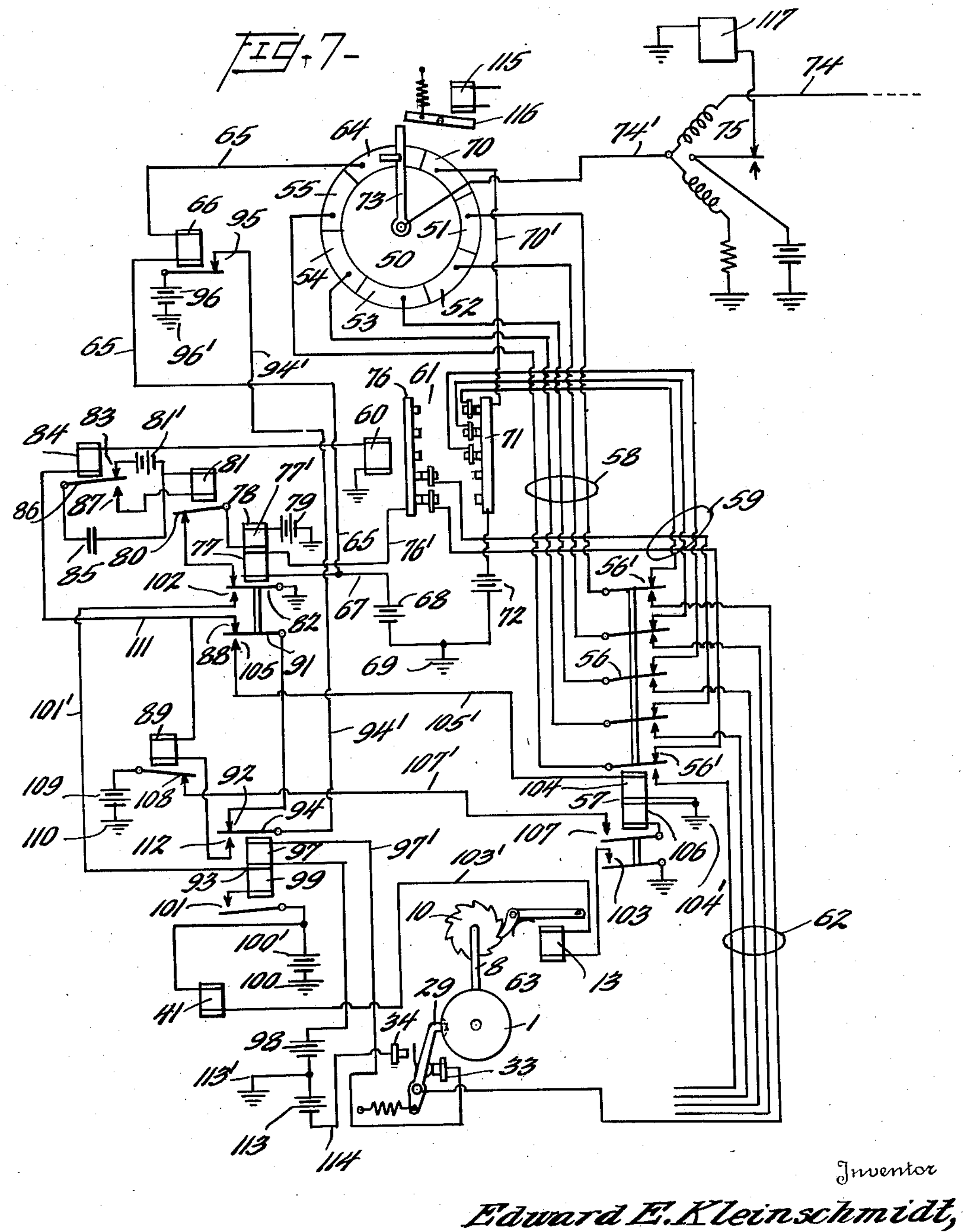
Figure 7 shows a preferred circuit arrangement of my invention as applied to the transmitting end of a simplex telegraph system.

Figure 7 shows the circuits set during the transmission of a message. The sending distributor 50 is of the well known Baudot system start-stop type, and transmits a start signal, five permutation code signals, and a stop signal. Code signal segments 51, 52, 53, 54, and 55 are connected respectively to armature levers 56 of switch relay 57 by wires 58. The upper contacts of armature levers 56 connect by wires 59 to the movable contacts of any well known type of Baudot code tape transmitter 61 which is operated by magnet 60. The lower contacts of armature levers 56 connect by wires 62 to contact fingers 25 to 29 of test instrument 63, contact lever 29 only being shown in this view.

Stop segment 64 of distributor 50 is connected through wire 65 and relay 66 to wire 67, positive battery 68 and ground 69. Start segment 70 is connected through wire 70′ to contact bar 71, negative battery 72, to ground 69. Brush arm 73 of distributor 50 is connected to line 74 through wire 74' and line 75. Contact bar 76 of tape transmitter 61 is connected through wire 76', operating coil 77 of relay 78 to wire 67, positive battery 68 and ground. Holding coil 77' of relay 78 is connected from grounded battery 79 through contacts 80 and 82 to ground at 82'. Relay 81 is connected through battery 81', upper contact 83 of relay 84 and through condenser 85 to armature 86. Lower contact 87 connects to the opposite terminal of relay 81. Transmitter operating magnet 60, and relay 84 are connected in series from ground to upper contact 88 of relay 78 and to relay 89. Contact lever 91 of relay 78 connects to upper contact 92 at relay 93. Armature lever 94 of relay 93 connects through wire 94' to contact 95 of relay 66, battery 96 and ground 96'. Operating coil 97 of relay 93 is connected through wire 97' to contact bar 33 and to positive battery 98 and ground 113'. Holding coil 99 of relay 93 connects from ground 100, battery 100', contacts 101 which are normally open through wire 101' to contact 102 at relay 78. Magnet 13 of test instrument 63 is in circuit with normally open grounded contacts 103 and numbering stamp solenoid 41 through wire 103' to battery 100' and ground 100. Operating coil 104 of relay 57 connects from ground 104' to contact 105 of relay 78 through wire 105'. The circuit of holding coil 106 of relay 57 is from ground 104', coil 106, contacts 107 which are normally open, through wire 107' to contacts 108, battery 109 and ground 110. Relay 89 connects to wire 111 and contact 112 of relay 93. Contact bar 34 of test instrument 63 connects to negative battery 113 and ground 113' through wire 114. Magnet 115 and stop lever 116 are normally included in the mechanism of the standard start-stop transmitting distributor 50 and when message transmission stops magnet 115 is energized in well known manner. Box 117 represents the receiving apparatus at this end of the duplex line circuit 74.

In the receiving terminal (Figure 8), the circuits are shown with a message being received. Armature 118 of receiving relay 119 (in duplex line 74) is connected to battery 120 and ground 120'. Contact 121 of relay 120 is connected through wire 121' to the start magnet 122 of start-stop receiving distributor 123, to the rotating brush arm 124, and to distributor segment 125. The distributor 123 may be of conventional type wherein brush arm 124 is frictionally driven and released for a single revolution by the start signal of each received signalling combination through operation of start magnet 122. Start magnet 122 may also be the operating magnet of a conventional start-stop printer (not shown) in which case brush arm 124 would be attached to the selecting shaft of the start-stop printer. Brushes 126, rotatable with but insulated from arm 124, normally rest on and are in contact with segments 125 and 128. Box 129 represents the transmitting apparatus at this distant end of the line, similar to the transmitting apparatus shown in Figure 7.

The receiving segments 132, 133, 134, 135, and 136 of distributor 123 connect by wires 137, respectively, to contact levers 138 of transfer relay 139. The upper contacts 140 of contact levers 138 each connect through wires 140' to perforator punch selecting magnets 141 to a common terminal wire 142, then through operating coil 146 of relay 147 and ground 148. Holding coil 149 of relay 147 connects from ground 150 and battery 151 through wire 150', coil 149, through contacts 152 of relay 153, contacts 154 of relay 147 to ground 148. Relay 153 is connected through condenser 155 by wire 153' to armature 156 of relay 157. Lower contact 158 of relay 157 connects to the opposite terminal of relay 153 through wire 158'. Upper contact 159 of relay 157 is connected through battery 160, condenser 155 and wire 153' to armature 156.

Segment 128 of distributor 123 connects through wire 161 through contact lever 164 of relay 173, and through wire 164', perforator punch and feed magnet 165 of receiving perforator 36*a*, and relay 157 to ground at 165'. Contact 166 of relay 147 connects through wire 166' operating coil 167 of relay 139 and relay 168 to ground 168'. Holding coil 170 of relay 139 connects from ground 170' through normally open contacts 171 of relay 139 through wire 171', normally closed contacts 172 of test relay 173, battery 151 and ground 150. Operating coil 174 of test relay 173 connects to ground 173' and contact bar 33 of test instrument 63 through wire 174'. Holding coil 175 of relay 173 connects from ground 150 and battery 151 through normally open contacts 176, wire 176', normally open contacts 177 and ground 177'. Numbering solenoid 41 and test instrument stepping magnet 13 are connected in series from ground 178 through wire 179 to normally open contacts 181 of relay 173, battery 151 and ground 150.

The lower contacts 182 of contact levers 140 of relay 139 are individually connected by wires 183 to contact fingers 25 to 29 of the test instrument 63, contact finger 25 only being shown in this view. Contact bar 34 is connected through wire 184 and relay 185 to ground 185'. Slow release relay 186 is connected through wire 186' from ground 187 through contacts 187' of relay 168 to holding coil 170 of relay 139. The circuit of trouble signal relay 188 includes battery 189, normally open contacts 190 of relay 168 and 191 of relay 186. Locking and signalling circuit of relay 188 is through battery 189, normally open contacts 192 of relay 188, wire 192', release key 193, and signal apparatus 194. Contacts 195 of relay 188 are included in a circuit from ground 120', battery 120 through wire 195', to start magnet 122 and ground. Contacts 196 of relay 185 are included in the operating circuit for relay 188 through wire 197.

*Operation of preferred embodiment*

Having described the circuit connections of a preferred test apparatus and a system embodying my invention during message transmission, I will now describe their operation. It will however be understood that the results to be obtained by the operation of the described circuits can be had by other circuit, relay and apparatus arrangements without departing from the invention herein disclosed.

The telegraph message is first prepared for transmission at a keyboard transmitter or keyboard perforator 36 in the usual manner. However, at the end of each message, or group of messages if they are all addressed for delivery at the same city, the operator at the keyboard of a start-stop transmitter adds the message end signal by operating the blank key which transmits only the start-stop signals but no selecting or marking code signals or, if a keyboard perforator is used, feeds out the tape 35 with at least one blank signal space so the tape will transmit the blank message end signal in passing through transmitter 37.

Figure 8:
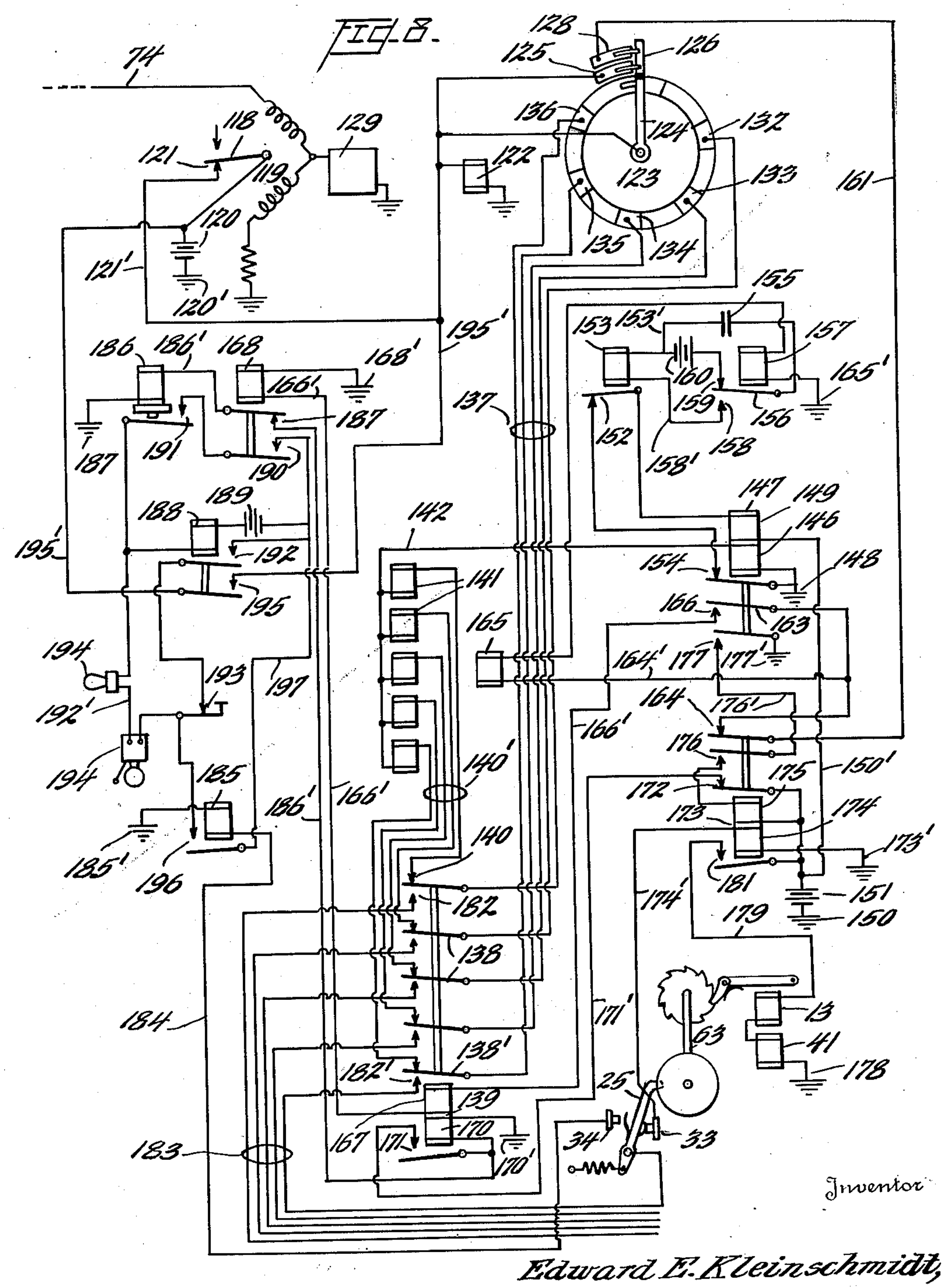
Figure 8 shows a preferred circuit arrangement applying my invention to the receiving end of a simplex telegraph system.

The circuits in Figures 7 and 8 are shown in the normal position for message transmission. In this condition of the system, positive battery 68, Figure 7, is connected to the line 74 through relay 66, stop segment 64 and brush arm 73. Relay 66 is energized and closes a circuit through contacts 95, 92, and 88 to energize relay 84 and transmitter operating magnet 60. Relay 84 closes a circuit through battery 81' and condenser 85 to charge the latter. Contacts 80 of relay 81 have closed a circuit through holding coil 77' of relay 78 to energize the same. Line relay 119 at the distant station, Figure 8, closes contacts 121 which close a local circuit from battery 120 to the stop or printer magnet 122, and brush arm 124 is arrested. A circuit from battery 120, contacts 121, segment 125, brushes 126, segment 128, perforator operating magnet 165 and relay 157 is also closed.

When brush arm 73 (Figure 7) now leaves stop segment 64, relay 66 is de-energized opening contacts 95, and the circuit through relay 84 and transmitter magnet 60 is broken. Transmitter magnet 60 releases its armature to feed the tape in accordance with the normal operation of a standard tape transmitter, and relay 84 opens contacts 83 and closes contacts 87, thus establishing a circuit through relay 81 and condenser 85, which then discharges through relay 81, operating armature 80, to open the circuit through holding coil 77' of relay 78 releasing armatures 82 and 91. When brush arm 73 contacts with start segment 70, a negative or spacing impulse is transmitted over line 74 from battery 72 which operates to move contact lever 118 of relay 119 (Figure 8) away from contact 121 opening the circuit to start magnet 122 which releases the selecting shaft of a normal start-stop printer as well as brush arm 124. The circuit to perforator operating magnet 165 of perforator 36a (Figure 6) is opened when brushes 126 leave segments 125 and 128, which then operates to feed the receiving tape 35a. The circuit to relay 157 is also opened. Relay 157 while it was energized closed a circuit through battery 160 and condenser 155 charging the latter. On the de-energization of relay 157, its armature 156 is released to close a circuit through relay 153 and condenser 155 which discharges through relay 153 operating the same to open the circuit through holding coil 149 of relay 147 so that, should relay 147 have been previously operated, it will now be released.

As brush arm 73 (Figure 7) continues to rotate, it will send the code combination of signals for the letter set up on transmitter 61 over the transmitting segments 51, 52, 53, 54 and 55 in positive and negative impulses. As shown in the setting of the contacts of transmitter 61, three negative impulses and two positive impulses will be transmitted. The three negative impulses will be sent from ground 69, negative battery 72, upper contacts 56', contact levers 56 of relay 57 to segments 51, 52 and 53, brush arm 73 and line 74 and operate relay 119 to move its armature away from contact 121. The two positive impulses will pass from ground, positive battery 68, through operating coil 77 of relay 78, upper contacts 56' of relay 57, contact levers 56 and segments 54 and 55 of distributor 50, brush arm 73 and to line 74. Relay 78 will be operated to close a circuit through its holding coil 77, and will prepare a circuit from contacts 95 (which are now open) of relay 66 through contacts 94 and 92 of relay 93, contacts 91 and 88 of relay 78, relay 84, magnet 60 and to ground. When thereafter brush arm 73 contacts with segments 64, the circuit through relay 66 is closed operating same to close contacts 95. Current will then pass from ground 96' and battery 96, contacts 95, contacts 94—92, contacts 91—88, relay 84, magnet 60 and ground. Magnet 60 will thereupon operate to feed the tape to position for the next code combination of signals. Relay 84 will operate to charge condenser 85 as before explained. As brush arm 73 leaves segment 64 and engages segment 70, the negative starting impulse will again be transmitted over line 74 as above pointed out. Magnet 60 will then release its armature allowing the usual feeler pins of a standard transmitter to set the transmitter contacts in accordance with the next code combination perforated in the tape. Relay 84 will close contacts 87 and condenser 85 will discharge through relay 81. Relay 81 opens the holding circuit to coil 77 of relay 78 which releases armatures 82 and 91. Brush arm 73 as it continues to rotate will transmit code combinations of signals to line 74 in the manner previously explained and so long as code combinations comprising at least one marking or positive signal are transmitted this cycle of operation continues.

At the distant end of line 74, relay 119 (Figure 8) will operate to open and close contacts 121 and magnet 122 will be operated to make settings in the start-stop receiving printer in accordance with the received impulses. The impulses received from relay 119 will also be transmitted to brush arm 124 so that, while the latter is travelling over segments 132 to 136 in unison with the travel of brush arm 73 over the transmitting segments, selecting magnets 141 of perforator 36a will be operated in accordance with the impulses received. According to the setting of tape transmitter 61 as shown in Figure 7, no impulses will be received on segments 132, 133, and 134, but impulses will be received on segments 135 and 136 which pass through the perforator selecting magnets 141 connected thereto and through operating coil 146 of relay 147 and to ground. Relay 147 will be operated to open contacts 166 and 177 and to close contact 154 which with contacts 152 of relay 153 are included in the circuit of holding coil 149 of relay 147 which therefore remains operated. When brushes 126 reach segments 125 and 128, the normal stop signal will be received from transmitting distributor over line 74 and contacts 121 of relay 119 will be closed. Current will pass from ground 120' and battery 120, contacts 121, to printer operating or start magnet 122 causing it to arrest brush arm 124 in accordance with the normal operation of a start-stop system. Current will also pass through brushes 126 from battery 120, segments 125 and 128, wire 161, contacts 164 of relay 173, perforator operating magnet 165, relay 157 and ground 165'. Magnet 165 will thereupon operate to perforate the tape 35a in accordance with the code signals received on magnets 141, and relay 157 will operate to charge condenser 155 in the manner previously explained. When brushes 126 leave stop segments 125 and 128, the circuit just described will be opened. Magnet 165 when de-energized will operate to feed the receiving tape 35a. Relay 157 then releases armature 156 to close the circuit through contact 158, relay 153 and condenser 155. Condenser 155 thereupon discharges through relay 153 operating it to open contacts 152 included in the circuit of holding coil 149 of relay 147 which then releases its contact armatures. This receiving cycle of operation continues as long as code combinations including at least one positive or marking signal are received.

Transmission continues until a blank or end of message signal comprising a code combination having no marking or positive signals is received. When such a signal combination is transmitted, no current will pass to operating coil 77 (Figure 7) of relay 78 while brush arm 73 passes over segments 51 to 55, and relay 78 therefore remains unoperated when brush arm 73 reaches stop segment 64. Relay 66 will be energized to close contacts 95, and an impulse will pass from ground 96' and battery 96, contacts 95, contacts 94—92 of relay 93, contacts 91—105 of relay 78, operating coil 104 of switch relay 57 to ground 104'. Switch relay 57 will operate to move contact levers 56 away from their upper contacts 56' to their lower contacts, thus switching the wires 58 from segments 51 to 55 out of contact with tape transmitter 61 and in contact with fingers 25 to 29, respectively, of test instrument 63 through wires 62. Switch relay 57 closes the circuit to its holding coil 106 through contacts 107 and closed contacts 108 of relay 89. Contacts 103 of relay 57 close the circuit for stepping magnet 13 and numbering solenoid 41 of the test instrument. Stepping magnet 13 will operate the test instrument to step cylinder 1 one step forward so that finger 29 will be moved out of indentation 2 and finger 25 will drop into indentation 6. Numbering solenoid 41 will operate to print a number on the underside of the transmitting perforated tape 35 in accordance with the number of the message transmitted.

The circuits are now set to transmit the test signal which proceeds in the following manner. As brush arm 73 passes over segment 70, it transmits the normal start signal to line 74. Then, as it passes over segments 51 to 55, it transmits the test signal. According to the setting of the test transmitter, fingers 26, 27, 28 and 29 at this time are in contact with bar 34 and connected to segments 54 to 51, respectively, and as contact bar 34 is connected to negative battery 113 and ground 113' negative impulses will be transmitted from fingers 26 to 29 over line 74. Contact bar 33 is connected to operating coil 97 of relay 93, positive battery 98 and ground 113' so that when brush arm 73 passes over segment 55 a positive test impulse will be transmitted over line 74 energizing relay 93. When relay 93 operates it closes a circuit through its holding coil 99 from ground 100, battery 100', contacts 101, holding coil 99, and contacts 102—82 of relay 78 to ground. Contact armature 94 of relay 93 is operated to move away from contact 92 into engagement with contact 112.

Then when brush arm 73 reaches segment 64, relay 66 is operated to close contacts 95 establishing a circuit from battery 96 and ground 96', contacts 94—112, relay 89, relay 84, magnet 60 to ground. Relay 89 opens the holding circuit for relay 57, releasing it and causing contact levers 56 to move away from the lower contacts into engagement with the upper contacts, thus again connecting segments 51 to 55 to the contacts of transmitter 61. Stepping magnet 13 and numbering solenoid 41 of the test transmitter are released by the opening of contacts 103 of relay 57. Magnet 60 will operate to feed the transmitting tape 35 ahead the space of one code combination, and relay 84 will operate to charge condenser 85. So long as the following code combinations to be transmitted are blank signals which contain no marking or positive signals, the circuits remain in this condition. When, however, a code combination containing a positive or marking signal reaches transmitter 61, relay 78 will be energized in the manner previously explained, and the holding circuit through coil 99 of relay 93 will be opened at contact 102 of relay 78, thus restoring the relays and circuits to the normal message transmission condition.

Upon reception of a blank or no character signal at the distant end of the line, relay 119, after receiving the start signal, does not receive any positive or marking impulses while brush arm 124 passes over segments 132 to 136 and no impulses are transmitted to perforator selecting magnets 141 and operating coil 146, of relay 147, which is not energized. When brushes 126 reach segments 125 and 128, the normal positive stop impulse is received on relay 119 which closes contact 121, establishing a circuit from ground 120' and battery 120 through printer magnet 122 to ground and through brushes 126, segments 125 and 128, contacts 164 of relay 173, contacts 163—166 of relay 147, operating coil 167 of switch relay 139, relay 168 to ground 168'. Switch relay 139 operates to disconnect segments 132 to 136 from wires 140' and perforator selecting magnets 141 and connects said segments to wires 183 and fingers 25 to 29, respectively, of receiving test instrument 63. Relay 168 is also operated. When switch relay 139 closes its locking circuit from ground 150 and battery 151 through contacts 172 of relay 173 and contacts 171 of relay 139, it is to be noted that relay 168 opens contact 187 before contacts 171 are closed so no impulse will pass to relay 186 over wire 186' at this time. Receiving perforator operating magnet 165 and relay 157 also receive an impulse from battery 120 and are operated at this time. Perforator operating magnet 165 when energized at this time, does not engage any punches since no positive or marking signals have been received. The message end or blank signal is therefore recorded in the receiving tape 35a, which will be fed forward the space of one code combination when perforator operating magnet 165 is de-energized. Relay 157 operates to charge condenser 155 as previously explained. This completes the operation at the receiving station when a message and blank combination is received and the circuits are prepared to receive the test signal.

As previously explained, the blank signal operated to leave relay 147 de-energized and switch relay 139 energized. Then, when the test signals comprising four negative and one positive impulses are transmitted over line 74, the negative impulses operate relay 119 to move its armature away from contact 121. The following positive pulse of the test signal will close contact 121 when brush arm 124 is in contact with segment 136, and a circuit will be established from ground 120', battery 120, brush arm 124, segment 136, lower contact 182 and lever 138' of relay 139, finger 25, contact bar 33, operating coil 174 of relay 173 and ground 173'. Relay 173 will operate and close a circuit through its holding coil 175 from ground 150, battery 151, contacts 176 of relay 173, closed contacts 177 of relay 147 to ground. Contacts 181 of relay 173 will close a circuit from ground 150, battery 151, contacts 181, test instrument operating magnet 13, numbering solenoid 41 to ground 178. Magnet 13 will operate the test instrument to step cylinder 1 one step forward. Finger 25 will then ride on face of cylinder 1 and finger 26 will drop into indentation 3. Numbering solenoid 41 will imprint a number on the upper side of the received tape 35*a*. Open contacts 172 of relay 173 will open the circuit of holding coil 170 of relay 139, releasing the same, so that contact levers 138 will now be restored to their normal position engaging their upper contacts 140. Contacts 164 of relay 173 will be opened. When thereafter brushes 126 contact with segments 125 and 128, and relay 119 receives a positive stop impulse, no current will pass from battery 120 to perforator magnet 165 since contacts 164 are open, perforator magnet 165 will not be operated, and the test signal just received will not be perforated in tape 35*a* and therefore not recorded. Start magnet 122 will be operated to arrest the printer selecting shaft and brush arm 124 in the normal manner.

When brush arm 124 is released for the reception of the next character code combination including positive or marking signals, then corresponding impulses will be received over segments 132 to 136, relay 147 will be energized in the manner previously described, and contact 177 will be opened to release relay 173 by opening the circuit through holding coil 175. Relay 173 thereupon assumes its normal unoperated position. When thereafter brushes 126 connect segments 125 and 128, an impulse will be transmitted to perforator operating magnet 165 and relay 156, as previously explained. Relay 147 will be de-energized each time brushes 124 leave segments 125 and 128 and re-energized on the reception of a marking or positive impulse as previously explained. Reception of a message now continues in this manner until the next blank combination is received.

As previously explained, the blank message end signal combination is transmitted and immediately thereafter a test signal is automatically transmitted by the test instrument 63. If there are more than one blank perforations in the transmitting tape, they will be transmitted to the receiving station, but will not be recorded by perforator 165 since no current can pass to perforator operating magnet 165 as long as relay 173 is operated and the contacts 164 remain open.

Should a line disturbance or any other fault prevent the receiving station receiving consecutive messages, the test instrument 63 at the receiving station will lose synchronism with test instrument 63 at the sending station, and corresponding fingers 25 to 29 of the two instruments will not be in contact with their bars 33 and 34, respectively. Then, when a test signal is received, relay 173 will not be energized since the contact finger in an indentation in the drum 1 and in contact with bar 33 at the receiving station will not correspond with the finger in contact with bar 33 at the sending station. When relay 173 is not energized during the test signal interval, brushes 126, when they reach segments 125 and 128, will close a circuit from ground 120′ and battery 120, contact 121 of receiving relay 119, segment 125, brushes 126, segment 128 of distributor 123, contacts 164 of relay 173, contacts 166 of relay 147, operating coil 167 of relay 139 and relay 168 to ground 168′. Relay 186 is now energized having been operated previously by the circuit through contacts 171 of relay 139 which were closed during the reception of the immediately preceding blank code combination. Relay 186 is slow to release so that, when relay 168 is operated the second time and contacts 191 and 190 are closed, a circuit is established through relay 188 and battery 189. Contacts 192 of relay 188 then close a locking circuit through relay 188 and battery 189, contacts 192, release key contact 193, and signal apparatus 194. Contacts 195 also close and connect battery 120 directly to start magnet 122 so that it cannot be released when relay 119 receives a start or negative impulse and, therefore, further signal combinations will not be recorded.

Signal apparatus 194 operates at this time to call in an attendant to correct any fault in the circuit or apparatus. Release key 193 when depressed will stop the operation of an alarm 194 by opening the holding circuit of relay 188. Since each message at the sending station and each properly received message at the receiving station are numbered by corresponding number imprints on the transmitting and receiving tapes 35 and 35*a*, it will be easy for the maintenance men to re-adjust transmission in the proper order so that no messages will be lost. Transmission is resumed after maintenance men at transmitting and receiving stations communicate with each other to correct the fault, identify the number of the last properly received message stamped on tape 35*a*, set the test instruments in corrected positions, and thereafter re-transmit messages which have not been received.

If for any reason a combination of impulses other than the correct test signal should be received after a blank signal, some of the contact fingers 25 to 29 at the receiving station will be in contact with contact bar 34. Then one or more impulses will be transmitted to relay 185 as well as to relay 173. If relay 185 is operated at any time, it operates contacts 196 to close circuit through battery 189, relay 188 and alarm apparatus 196. Relay 188 thereupon locks up, the alarm is given, and start magnet 122 is also energized as previously explained so that reception and re-transmission by re-transmitter 37*a* stops until the fault is corrected.

If the receiving apparatus is not started properly on the reception of a start signal on start magnet 122, or is otherwise out of order, relay 139 will receive several impulses in succession over contact 164 of relay 173 and contact 177 of relay 147. From previous explanation it will be noted that the second impulse on relay 139 then operates relay 168 after slow relay 186 has been operated. This closes the circuit through contacts 190, 191, relay 188 and battery 189 and operates relay 188 to start the alarm 194.

The alarm 194 will also normally be operated if the receiving distributor does not operate in synchronism with the sending distributor or if the circuits are out of order, for under such conditions it is very unlikely that the test signal will be properly received.

If one or more blank signal combinations are received in the body of a message, the first blank combination will switch the circuits of receiving segments 132 to 136 from the perforator selector magnets 141 to fingers 25 to 29 of the test instrument as above described. Then, after the second blank combination is received, a second stop or sixth pulse impulse will be transmitted to operating coil 167 of relay 139 and to relay 168, which as previously explained will close contacts 190 and 191 and start the alarm 194. If just one blank is received in the body of a message, the next received code combination will cause the alarm apparatus to operate for the reason that the receiving test instrument will not be in synchronism with the received test signal, or one or more impulses will be received on contact bar 34 of the receiving test instrument.

It will be noted that the received test signal is not recorded with the received message in the perforated tape. This is important where the tape is used for re-transmission for if the test signal combination were recorded at the end of a message, it would interfere with the operation of the test signal generated at the re-transmitting station and would cause false stopping of the receiving apparatus.

*Multiplex system*

Figure 9:
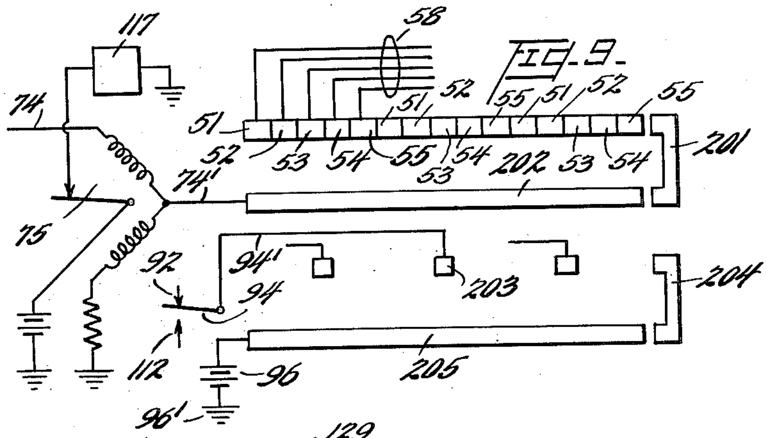
Figure 9 shows the transmitting and associated local segments of a multiplex distributor at the sending station for use with my invention.
Figure 10:
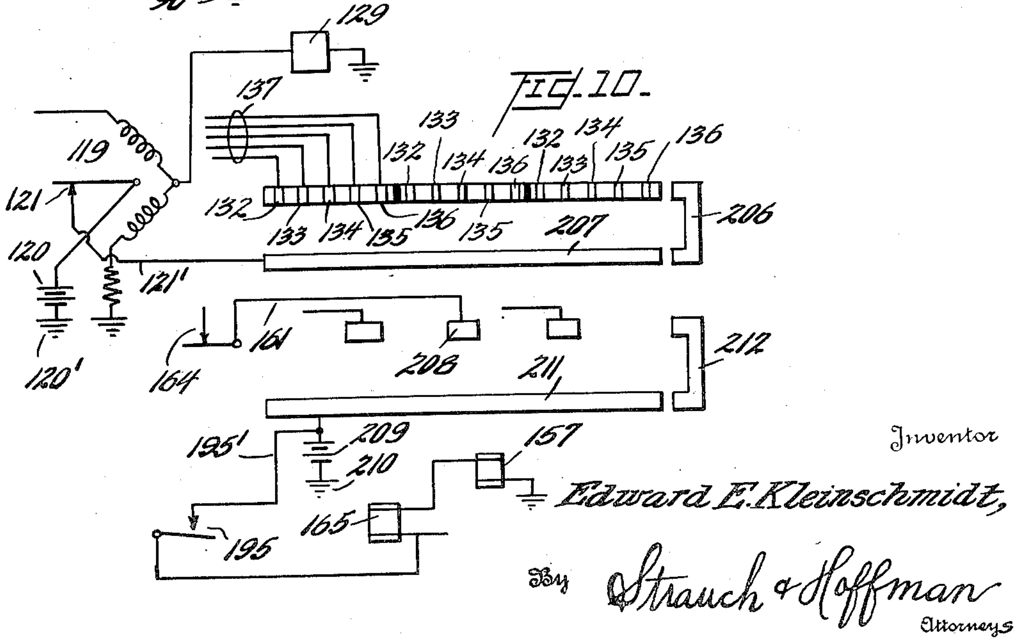
Figure 10 shows the receiving and associated local segments of a multiplex distributor at a receiving station for use with my invention.

The system of circuits so far described may be applied to a multiplex system for transmitting and receiving messages as illustrated in Figures 9 and 10.

In this form of my invention three groups of distributor segments 51 to 55 of a three channel multiplex distributor are each connected through conductors 58 to contact levers 56 of a relay 57 as illustrated in Figure 7. The groups of segments 51 to 55 are connected successively by brush 201 to contact ring 202 which in turn is connected to line 74 through conductor 74' and line relay 75 as illustrated in Figure 7. I also replace relay 66 and segment 64 of Figure 7 with a distributor ring having a segment 203 for each channel to which three conductors 94' are connected and which in turn connect directly to contact finger 94 of relay 93 in Figure 7. A brush 204 rotating in unison with brush 201 connects the segments 203 at properly timed intervals to conducting ring 205 which in turn is connected to battery 96 and ground 96' illustrated in Figure 7.

In like manner at the receiving end three groups of receiving segments 132 to 136 of a three channel multiplex receiving distributor are individually connected by wires 137 to the contact levers 138 of three relays 139 as illustrated in Figure 8. Brush 206 connects these segments successively to common ring 207 which in turn is connected to contact 121 of receiving relay 119 and battery 120 to ground 120' through conductor 121' illustrated in Figure 8. Local or, as usually termed, sixth pulse, segments 208 are connected through wires 161 to contacts 164 of three relays 173 connected as illustrated in Figure 8. Contacts 195 of relays 188 connected as in Figure 8 are connected through wire 195' and start magnet 122 of Figure 8 is eliminated. Contacts 195 will operate to close a circuit when a fault occurs to put positive battery 209 from ground 210 on perforating operating magnet 165 as shown. Battery 209 is also connected to ring 211 of the receiving distributor which in turn is connected by brush 212 rotating in unison with brush 206 to local pulse distributor segments 208.

The transmitting and receiving distributors are maintained in synchronism in any well known manner and, as will be understood by those versed in the art, certain parts and connections normally associated only with a start-stop system for maintaining synchronism which are shown in Figures 7 and 8, such as start magnet 112, relay 66, start segment 70, stop segment 65 at the transmitting station, and printer start magnet 122 at the receiving station, will be eliminated when using the multiplex circuit connections and distributors as illustrated.

In operation of this form of my invention brushes 201 and 204 rotate in synchronism with brushes 206 and 212. Transmitting brushes 201 and their associated parts perform the message transmitting functions of the distributor brush on arm 73. Brushes 204 and associated parts perform the control functions of relay 66 illustrated in Figure 7 in each of the transmitting channels. Receiving brushes 206 and 212 and their associated parts likewise perform the functions of brush arm 124 and brushes 126 of Figure 8.

If, due to line or apparatus failure, no positive or marking impulses are received on relay 119 and contacts 121 remain open, brushes 212 will contact with segments 208 and ring 211. (Figure 10) several times in succession and if this occurs at any time other than during the reception of blank code combinations following the reception of a test code combination, relay 139 will receive several impulses in succession and the alarm operated as above. The remaining individual channel equipment associated with the transmitting and receiving distributors and not shown in Figures 9 and 10 is similar to that illustrated in Figures 7 and 8 and will be understood by those skilled in the art from the description thereof hereinbefore given in connection with Figures 7 and 8.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A system for transmitting and receiving telegraph messages comprising message transmitting apparatus; test signal transmitting apparatus; means associated with said message transmitting apparatus to condition said test signal apparatus to transmit different combinations of signal impulses each including a positive test signal at intervals between messages; message receiving apparatus; test signal receiving apparatus interconnected in the line circuit with said test signal transmitting apparatus; circuits associated with said message receiving apparatus and set at the end of a message to receive a test signal; means to compare said set circuits with the position of said received test signal, and means to stop the further reception of messages when the received test signal does not correspond with the setting of the test signal circuits at the receiving apparatus.

2. In a telegraph system, means for transmitting message signals and special signal combinations to indicate the end of a message; receiving means for said message signals; means under the control of said receiving means for detecting and recording said message and message end signals; and means rendered operative in response to the reception of consecutively transmitted message end signals to prevent the duplicate recording of said signals.

3. A system for transmitting and receiving telegraph messages comprising automatically operated means for transmitting message signals and a message end signal between messages; receiving apparatus for recording received messages; means associated with said receiving apparatus to detect and record said message end signal; means responsively controlled by said message end signal controlling operation of the message recording apparatus to stop the recording of said messages and to condition the recording means to record a subsequently received code combination; and further means responsively controlled by the subsequently received code combination to restore said message recording apparatus to operative condition.

4. A system for transmitting and receiving telegraph messages in permutation code comprising message and message end signal transmitting apparatus; message receiving apparatus; means associated with said transmitting apparatus to detect a message end signal and thereupon stop the transmission of telegraph messages and start the transmission of a test signal code combination consisting of one marking signal and four spacing signals; means to progressively change the relation of the marking signal to the spacing signals in successive test signal code combinations; and additional means to render the transmitting apparatus effective for the resumption of transmission of telegraph messages after a test code combination has been transmitted.

5. A system for transmitting and receiving telegraph messages embodying message transmitting apparatus for transmitting message code combinations of marking and spacing signals and a message end signal code combination; test signal transmitting apparatus operative in response to said message end signal to transmit one of a series of differing test signal code combinations, each consisting of one marking signal and a plurality of spacing signals, said marking signals being transmitted in progressive succession with relation to said spacing signals; message receiving apparatus; test signal receiving apparatus associated with said message receiving apparatus; means to successively and progressively set said test signal receiving apparatus after the reception of each message end signal code combination; means associated with said test signal receiving apparatus to receive and compare the received test signal code combination with the progressive setting of said test signal receiving apparatus; means for conditioning said message receiving apparatus to permit continued reception of message signals if the received test signal code combination corresponds with the progressive setting of said test signal receiving apparatus; and means operatively controlling said conditioning means to stop the reception of said message signals if said received test signal code combination does not correspond with the setting of said test signal receiving apparatus.

6. In a telegraph system, message and message end signal transmitting apparatus; means responsive to a message end signal for transmitting a test signal; receiving apparatus responsive to said message and message end signals including means to record the received message and message end signal in a record medium to be used for retransmitting said signals; means to receive said test signal; means under control of said test signal receiving means for controlling the operation of said message and message end signal receiving apparatus and additional means to render the recording means inoperative to record said test signal in said record medium.

7. A system for transmitting and receiving groups of signal combinations; signal transmitting apparatus; signal receiving apparatus; a line circuit connecting said transmitting and receiving apparatus; said signal receiving apparatus including a record medium used for the purpose of retransmitting received groups of signal combinations to a succeeding line circuit; means for transmitting a test signal at intervals between transmitted groups of signal combinations; means for receiving said test signal; means under control of the signal receiving apparatus and responsive to the reception of a test signal to prevent the recording of said test signal in the record medium.

8. In a system of telegraphic communication having message transmission and receiving apparatus connected over a line circuit; test signal transmitting and receiving apparatus connected in said line circuit, means automatically responsive only to the reception of a complete message and message end signal by said message receiving apparatus to establish a test signal receiving circuit between said test signal transmitting and receiving apparatus, and means automatically responsive to any one of a plurality of abnormal message or test signal transmitting conditions to disable said message receiving apparatus.

9. In a system of telegraphic communication having message transmission and receiving apparatus connected over a line circuit; test signal transmitting and receiving apparatus connected in said line circuit, means automatically responsive only to the reception of a complete message and message end signal by said message receiving apparatus to establish a test signal receiving circuit between said test signal transmitting and receiving apparatus, means automatically responsive to any one of a plurality of abnormal message or test signal transmitting conditions to disable said message receiving apparatus, and means responsive to a subsequently transmitted combination of message signals to restore said message receiving apparatus to operative condition.

10. In a method of detecting faults in the transmission of telegraph messages between sending and receiving stations, establishing a test signal transmission circuit and transmitting a test signal between said stations in response to the transmission of each message and message end signal, and conditioning the message receiving apparatus in response to improper reception of said test signal to discontinue further message reception.

11. In a system of telegraphic communication having message transmitting and receiving apparatus connected over a line circuit; test signal transmitting apparatus connected with the message transmitting apparatus and operatively controlled thereby, test signal receiving apparatus connected with the message receiving apparatus and operatively controlled thereby, and means for interconnecting the test signal transmitting and receiving apparatus in the line circuit connections between the message transmitting and receiving apparatus, automatically responsive to the reception of a complete message and message end signal by said message receiving apparatus, to establish circuits for transmitting to the signal receiving apparatus a plurality of different combinations of test signal impulses in periodic succession between the reception of said message end signal and the reception of a succeeding message.

12. In a telegraph system, two stations, a circuit connecting said two stations, means at one of said stations controlled by forms carrying code markings to transmit signals, means at the other of said stations controlled by said signals to make a record on record receiving material, a number stamp having indications at each of said stations associated with the record material at that station, means to operate each stamp once for each message, means operative during predetermined ones of the intervals between messages to interrupt the message transmission, and means operative during an interruption to transmit signals to compare the indications.

13. Telegraph apparatus for automatically checking consecutive designations of messages represented by code combinations accompanying the messages and arranged in predetermined sequence, comprising a communication channel over which the messages arrive, an instrumentality, means for preventing the instrumentality from operating in case the message designations are received in the predetermined sequence represented by their designations, and other instrumentalities controlled by message designating codes occurring out of the predetermined sequence for causing the instrumentality to operate.

14. An arrangement for verifying the receipt in numerical order of code messages consecutively numbered which messages arrive over a channel of transmission, comprising, in association with said channel, a stepping device initially settable in accordance with a first number, means for comparing the first number as received with the position of the stepping device, and means controlled incident to the receipt of each message for stepping the stepping device forward to the next consecutive number.

15. In a system of telegraphic communication, a transmitting station, a receiving station, means at said transmitting station for generating permutation code signals at predetermined intervals, means at said receiving station for establishing identical code signal conditions concurrently with but independently of those at said transmitting station, and a comparison apparatus including alarm means for responding to any differences in the composition of said code signals at said transmitting and receiving stations.

16. In a telegraph system, a signaling circuit, similar code signal control devices at terminals of said circuit, a sensing device at each of said terminals to sense the codes presented in effective position by said code signal control device, and means controlled locally as well as over said circuit to simultaneously advance both said code signal control devices to variable code settings.

17. In a communication system, an arrangement for verifying the receipt in numerical order of sequentially numbered messages transmitted over a channel of transmission, comprising, in association with said channel, means for transmitting codes indicative of the sequential order of said messages, means for receiving said codes, means for testing said codes for sequential order, and means for indicating failures of said testing means to find sequential order of said codes.

EDWARD E. KLEINSCHMIDT.

REFERENCES CITED

The following references are of record in the file of this patent:

UNITED STATES PATENTS

| Number | Name | Date |
|---|---|---|
| 1,370,669 | Potts | Mar. 8, 1921 |
| 1,972,326 | Angel | Sept. 4, 1934 |
| 2,193,812 | Blanton | Mar. 19, 1940 |
| 2,193,967 | Kleinschmidt | Mar. 19, 1940 |
| 2,221,129 | Cowan | Nov. 12, 1940 |
| 2,230,081 | McCann | Jan. 28, 1941 |
| 2,281,745 | Buckingham | May 5, 1942 |
| 2,293,704 | Blanton | Aug. 25, 1942 |
| 2,295,636 | Currie | Sept. 15, 1942 |
| 2,351,014 | Connery | June 13, 1944 |